United States Patent [19]

McErlane

[11] 4,262,953
[45] Apr. 21, 1981

[54] UNDERMOUNTED AIR DEFLECTOR FOR TRUCKS AND TRAILERS

[75] Inventor: John C. McErlane, Green Bay, Wis.

[73] Assignee: Premix, Inc., North Kingsville, Ohio

[21] Appl. No.: 59,001

[22] Filed: Jul. 19, 1979

[51] Int. Cl.³ .............................................. B62D 35/02
[52] U.S. Cl. ..................................... 296/1 S; 180/89.1
[58] Field of Search ................ 296/1 R, 1 S; 180/89.1

[56] References Cited

U.S. PATENT DOCUMENTS

| | | | |
|---|---|---|---|
| 2,199,883 | 5/1940 | Ishiwata | 296/1 S |
| 3,743,343 | 7/1973 | Grote, Sr. et al. | 296/1 S |
| 3,869,617 | 3/1975 | Gaussoin et al. | 296/1 S |
| 4,119,339 | 10/1978 | Heimburger | 296/1 S |

Primary Examiner—John J. Love
Assistant Examiner—Ross Weaver
Attorney, Agent, or Firm—Wheeler, House, Fuller & Hohenfeldt

[57] ABSTRACT

An airfoil or deflector panel for being mounted ahead of the rearmost set of wheels of a vehicle such as a truck or tractor-drawn trailer to direct air flow in a manner which reduces the relatively negative air pressure normally occurring behind a moving vehicle. The surface of the deflector which is presented in the direction of vehicle motion has a bilateral or compound convex curve.

13 Claims, 6 Drawing Figures

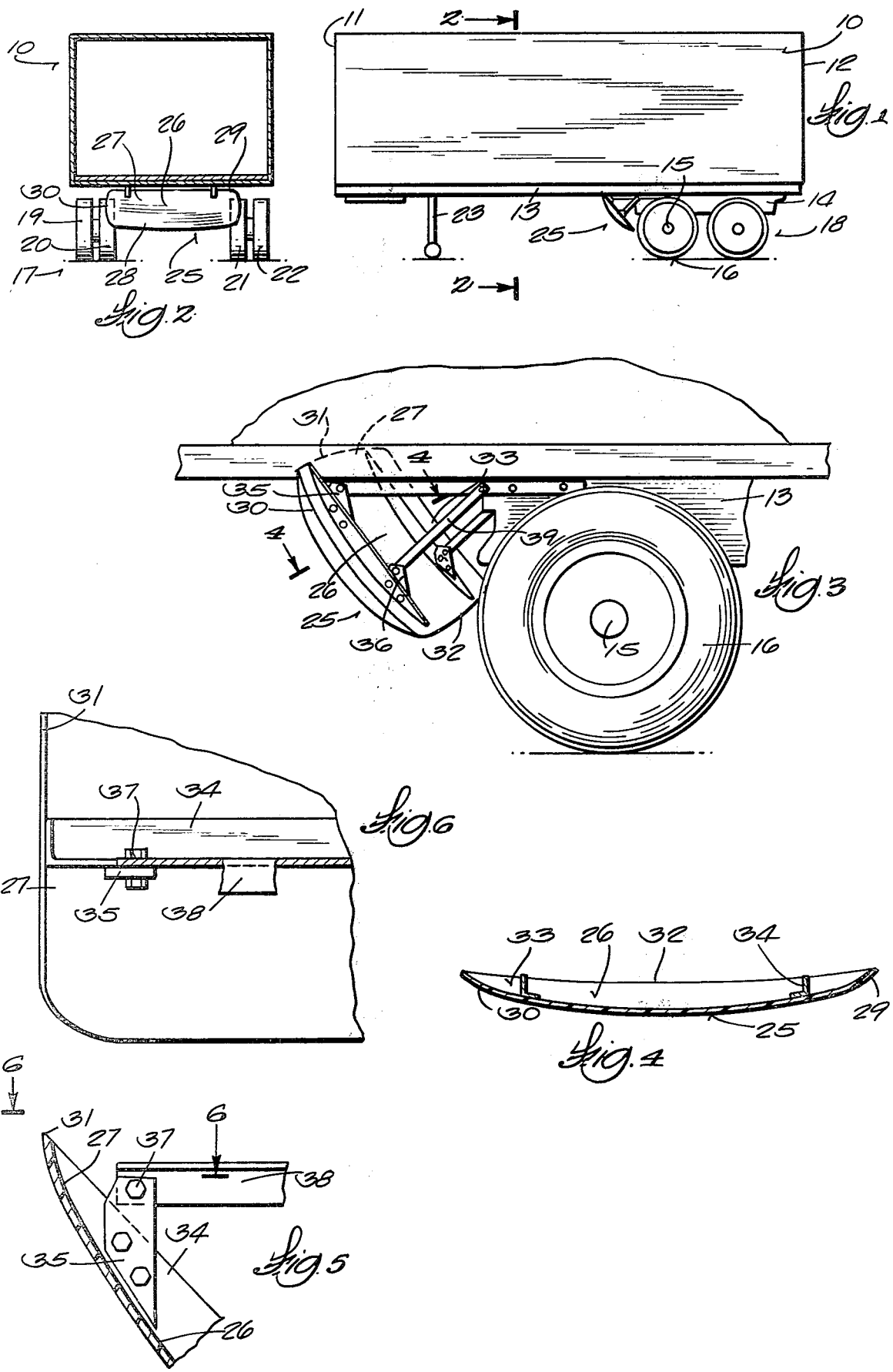

UNDERMOUNTED AIR DEFLECTOR FOR TRUCKS AND TRAILERS

BACKGROUND OF THE INVENTION

This invention relates to apparatus for reducing the negative air pressure that normally exists behind a moving vehicle such as a truck or tractor-drawn trailer.

It is well-known that a moving vehicle develops a positive air pressure on surfaces which are presented in the direction of travel and negative or subatmospheric pressure (hereinafter called vacuum sometimes for the sake of brevity) simultaneously on the rear side of such surfaces. Thus, considering a rapidly moving vehicle as a whole, negative pressure normally exists behind its rear so there is a pressure differential or force that tends to subtract from the force and energy provided by the engine for driving the vehicle forward. The fact that significant amounts of snow are drawn into the ambient around the rear of a truck and plastered on its rear surface is some manifestation of the existence of these differential pressure conditions. Of course, the forces required to compensate or equalize the pressure differentials must be derived from the engine at the expense of increased fuel consumption.

Improving the aerodynamic properties of vehicles, particular commercial vehicles, which travel great distances, is a widely recognized requirement. Many proposals have been made for fulfilling this requirement. Some give attention to reducing air resistance of the tractor or truck cabin and to the body of the vehicle and others position airfoils or deflectors at supposedly strategic locations in an effort to reduce negative pressure or air turbulence at some places near the front of the vehicles such as around the top and rear of the cabin.

By way of example, U.S. Pat. No. 3,929,202 to Hobbensiefken basically teaches sloping the front upper part of a truck or tractor cabin rearwardly and placing angulated airfoils or deflectors in the front end region of the vehicle including a deflector forwardly of the frontmost wheels above road level to reduce turbulence and possibly vacuum conditions near the front end of the vehicle, but it is not evident that the problem of reducing vacuum at the rear of the vehicle as a whole is specifically addressed.

U.S. Pat. No. 4,119,339 to Heimburger illustrates a deflector mounted forward of the front wheels and of the engine for diverting air flow downwardly and sideways when the vehicle is in motion. A mechanism is provided for enabling the deflector to be pivoted upwardly to a more nearly horizontal position to get it out of the way when there is a prospect for driving over very rough terrain which could result in deflector destruction. The deflector is not located where it could have significant effect on reducing vacuum at the rear of the vehicle nor does it seem that the problem is recognized.

U.S. Pat. No. 3,348,873 to Saunders teaches locating airfoils or deflectors in the front end region of a tractor and van type trailer combination mainly in the region defined by the rear of the tractor cabin and the front of the van body. One deflector is ahead of the rear wheel of the tractor but there is no suggestion for locating a deflector where it might be most effective to reduce vacuum or negative pressure which is prevalent in the rearmost region of the vehicle and which has the greatest effect on increasing the engine load.

SUMMARY OF THE INVENTION

The invention described herein focuses on reducing the negative pressure or vacuum in the region of a vehicle where differential pressure has the greatest net vehicle retarding effect, that is, at the rear of the vehicle. In accordance with the invention, an airfoil or what may be more aptly called a deflector panel is located under the vehicle body on the foreward side or ahead of the rearmost set of wheels. The deflector is preferably formed with a front or attack surface which has a compound curvature, that is, it is curved bilaterally or convexly. The deflector panel is angulated for deflecting air, when the vehicle is moving forward, with downward and rearward components of motion so that most of the air which is impinged by the deflector is directed between the rear wheels to alleviate vacuum which would otherwise exist at the rear of the vehicle body. The deflector curvature is such that air which deflects sideways or laterally also has a rearward component of motion which aids in reducing the vacuum. Comparative tests run with the deflector installed and without it have shown that a substantial reduction in fuel consumption can be achieved when it is present and that snow accumulation on the rearmost surfaces of the vehicle is less with the deflector installed than without it. Reducing the amount of snow that is projected and swirled at the back of the vehicle is a safety benefit to motorists following a truck or trailer.

A fundamental object of the invention is to provide an air stream to the ambient region immediately behind a moving vehicle to reduce the negative vehicle retarding pressure which would otherwise exist and, hence, reduce fuel consumption by the engine that is being used to propel the vehicle.

A further object is to provide a deflector for properly directing air flow from a region ahead of the rearmost set of vehicle wheels to the rear of these wheels and to the region aft of the vehicle body.

How the foregoing and other more specific objects of the invention are achieved will be evident in the more detailed description of a preferred embodiment of the invention which will now be set forth in reference to the drawing.

DESCRIPTION OF THE DRAWING

FIG. 1 is a side elevation of a vehicle, particularly, a trailer van on which the new air flow control deflector is installed immediately forward of the rearmost set of wheels, the tractor for pulling the trailer being omitted;

FIG. 2 is a vertical section, on a line corresponding with 2—2 in FIG. 1, showing a frontal view of the undermounted deflector;

FIG. 3 is a view of the deflector and its mounting means from a side and rear perspective;

FIG. 4 is a transverse section of the deflector taken along a line corresponding with 4—4 in FIG. 3;

FIG. 5 is a partial longitudinal section taken in the leading edge region of the deflector and showing the front end mounting brackets; and FIG. 6 is a partial plan view of the deflector looking toward the irregular line 6—6 in FIG. 5.

DESCRIPTION OF A PREFERRED EMBODIMENT

The vehicle used for illustrating an application of the new airfoil or deflector is a trailer van as shown in FIGS. 1 and 2. The van comprises a load carrying body 10 having a front wall 11 and a rearmost wall 12 which, as in the illustration, is usually flat and vertical and usually has doors which are not shown. In any event, the rear wall is usually devoid of good aerodynamic characteristics such that negative or subatmospheric pressure develops in the ambient region aft of the body and, particularly, aft of rear wall 12 when the vehicle is being propelled forwardly at high speed which is to the left in respect to the FIG. 1 orientation of the vehicle.

In FIG. 1, vehicle body 10 is mounted on a chassis or main frame 13 on which the floor of the body rests and there is a subframe 14 mounted to frame 13. Subframe 14 has the wheel axles, such as the axle 15 which is coincident with the center of tire 16, and the axle suspension system, not visible, is mounted to the subframe in accordance with conventional practice which requires no elaboration. The illustrated vehicle is a so-called double axle type to accommodate two sets of wheels in tandem such as the sets marked 17 and 18 in FIG. 1. As can be seen in FIG. 2, a typical set is composed of four coaxial wheels 19–22. In FIG. 1 the van is shown resting on a swivel frame 23 since the vehicle is presently parked.

The new deflector is designated generally by the reference numeral 25 in FIGS. 1, 2 and 3. FIG. 1 shows the deflector to be angulated and mounted to subframe 14 ahead of or on the forward side of the rearmost sets of vehicle wheels which is true for the illustrative van and for any truck or vehicle to which the deflector is applied.

The front or forward surface of the deflector panel 25 has compound convexity, that is, it is generally curved in the longitudinal or forward direction and sidewise or in the lateral direction. Referring to FIG. 2, the principal central area 26 of deflector 25 has a relatively long radius of curvature and is longitudinally separated leading and trailing marginal areas 27 and 28, and its laterally separated side margin areas 29 and 30 have slightly smaller radiuses of curvature or are more sharply curved than central area 26 in this preferred embodiment. The lateral section of deflector 25 in FIG. 4 shows more clearly how the longer radius of curvature in central area 26 compares with lesser radius in the lateral or side margin areas 29 and 30. Similarly, the partial longitudinal section of the deflector depicted in FIG. 5 shows how the leading margin area 27 is curved more than central area 26. As can be seen in FIG. 3, the most forward or leading edge 31 of the deflector is straight across whereas the aft most or trailing edge 32 is curved crosswise. The leading edge is preferably made straight to enable positioning the deflector so the smallest gap will exist between the underside of the vehicle floor to minimize the amount of horizontally traveling air which might leak past the deflector when the vehicle is in motion. The object is to direct as much air as possible downwardly and rearwardly for the airstream to pass between the innermost vehicle wheels to the region behind the rear of the vehicle. Deflector panel 25 is angulated in a longitudinal direction and is preferably mounted at an angle of substantially 45° with respect to vertical for directing a major part of the impacted air most advantageously rearwardly between the innermost pair of wheels, and, inevitably, a minor part of the air along the outside of the wheels to neutralize the negative pressure aft of the rear 12 of the vehicle. The angle may have to be varied to accommodate conditions and interferences to mounting in some cases. The deflector will maintain substantial air directing efficacy as long as an angle in the range of 33° to 57° with respect to vertical is obtained. The measured angle in this example would be between a vertical line and a chordal line, said chordal line being one that runs centrally of the deflector panel 25 from leading edge 31 through the shortest distance to trailing edge 32. Generally, the deflector should be mounted in any vehicle as close as conditions permit to the periphery of the vehicles tires. As a practical matter, a minimum clearance of about six to eight inches between the deflector and the most forward tires on the rear set of wheels is recommended. The trailing or lower edge 32 of deflector panel 25 should preferably be at a level at least a small amount below the center of the tire but should be high enough to meet accepted road clearance standards. The width or lateral dimension of the deflector panel 25 desirably should be great enough for its side edges to reach the center of the outermost tires.

Deflector panel 25 may be mounted under the floor of the vehicle in various ways but the mode which is deemed to be the best and which is illustrated involves mounting in a manner which involves flexibility in setting the rearward and forward position of the deflector as well as its angular attitude. The preferred way of deflector mounting uses two angle members 33 and 34 which have right angular cross sections as can be seen in FIGS. 3 and 4. Members 33 and 34 extend generally longitudinally and substantially from leading edge 31 to trailing edge 32 of the deflector panel as can be seen in FIG. 3. Members 33 and 34 may be interfaced with and fastened to the deflector panel by any suitable fastening means, not shown. Since the deflector itself is preferably molded of reinforced plastic material, the angle members can be molded integrally to it if desired or the members may have any configuration or be made of any material which provides a flange for connecting a mounting bracket.

FIG. 3 shows that members 33 and 34 have brackets, such as those indicated by the numerals 35 and 36, fastened to them. The leading end brackets such as those marked 35, as can be seen in FIGS. 5 and 6, are fastened by means of bolts 37 to a longitudinally extending member 38 which is mounted to the vehicle body and has a mate, not visible, in parallelism with it. Thus, until bolt 37 is tightened, and until the rest of the mounting means is secured, the deflector panel can be pivoted on bolt 37 to permit the angulation of the deflector panel to be established.

The rear end of the deflector panel is supported on struts 39 which connect to bracket plates 36 at one end and to members 38 at the other end.

The mounting means provides for adjusting the deflector to various angles to compensate for truck and trailer differences such as tire radius, floor height, sliding suspensions and so forth. As indicated earlier, in any case the deflector panel should be mounted with its top or leading edge as close as possible to the underside of the vehicle and should extend downwardly as far as possible within practical limits to allow for clearance of obstacles on the roadway. It has been found that providing the mounting hardware for four different deflector angulations is enough to cover the large majority of vehicles, especially commercial vehicles such as trucks and trailers which come close to being standarized insofar as the components which have a bearing on the location of the deflector panel is concerned.

It would be unprofitable to attempt to discuss in detail the exact paths along which the deflector directs the air to the negative pressure region of the moving vehicle. It is sufficient to point out that a deflector constructed and mounted as described forward of the rearmost set of vehicle wheels results in a substantial reduction in the power required to propel the vehicle at higher speeds. Moreover, use of the invention lowers torque requirements in the vehicle drive train and lowers stress on the engine and other parts so that vehicle life is prolonged.

Although a preferred embodiment of deflector panel assembly has been described in detail, such description is to be considered illustrative rather than limiting, for the basic concepts of the invention can be variously implemented and are to be limited only by interpretation of the claims which follow.

I claim:

1. A device for reducing the vacuum ordinarily developed in a region immediately aft of the rear of a longitudinally moving vehicle which has a body and laterally spaced apart rear wheels mounted on axles under and near the rear of the body, said device comprising:
a deflector panel having a front surface on which air impinges when the vehicle is in motion, said panel extending laterally across the space between said rear wheels and being supported immediately ahead of said rear wheels at a longitudinally angle that results in a major portion of the impinging air being directed downwardly and rearwardly for flowing between said wheels into said region to thereby reduce the vacuum.

2. The device as in claim 1 wherein said front surface of said deflector panel has compound curvature.

3. The device as in claim 1 wherein said front surface of the deflector panel is forwardly convex and continuously curved as defined by a major central area having a large radius of curvature, and longitudinally spaced apart leading trailing margin areas and laterally spaced apart side margin areas, respectively, having shorter radiuses of curvature than said central area.

4. A device for reducing the vacuum ordinarily developed in a region immediately aft of the rear of a longitudinally moving vehicle which has a body and laterally spaced apart rear wheels mounted on axles under and near the rear of the body, said device comprising:
a deflector panel having a front surface on which ar impinges when the vehicle is in motion, said panel being supported immediately ahead of said rear wheels at a longitudinal angle that results in a major portion of the impinging air being directed downwardly and rearwardly for flowing between said wheels into said region to thereby reduce the vacuum, the lateral width of said deflector panel being sufficient for said panel to extend over a distance at least as great as the distance the innermost pair of wheels in front of which said panel is mounted, said front surface of said panel being generally convex toward the normal forward direction of vehicle travel.

5. The device as in any of claims 1, 2 or 3 wherein said longitudinal angle of said deflector panel relative to vertical is about 45°.

6. The device as in any of claims 1, 2 or 3 wherein said longitudinal angle of said deflector panel relative to vertical is in the range of 33° to 57°.

7. The device as in any of claims 1, 2 or 3 wherein said deflector panel is comprised of molded plastic material.

8. The device as in any of claims 1, 2 or 3 wherein said panel is mounted with the edge of its leading margin close to the underside of the floor of said body and said panel has a longitudinal size sufficient for the edge of its trailing margin to extend below a horizontal plane passing through the center of the wheels.

9. A device for reducing the vacuum ordinarily developed in a region immediately aft of the rear of a longitudinally moving vehicle which has a body and laterally spaced apart rear wheels mounted on axles under and near the rear of the body, said device comprising:
a deflector panel having a front surface on which air impinges when the vehicle is in motion, said panel being supported immediately ahead of said rear wheels at a longitudinal angle that results in a major portion of the impinging air being directed downwardly and rearwardly for flowing between said wheels into said region to thereby reduce the vacuum, and
mounting means for said deflector panel comprising a pair of elongated members fixed to the rear surface of said panel and extending longitudinally thereof, means for making a temporarily pivoting connection between corresponding leading end portions of said members and the underside of said vehicle including means for subsequently locking said panel against pivoting when its angle is established, a pair of struts each having one of their corresponding ends connected near the trailing end portions of said members and their opposite corresponding ends being adapted for connection to the underside of said vehicle, the length of said struts being such as to establish said angle.

10. In combination with a vehicle, equipment for reducing the vacuum ordinarily developed in a region immediately aft of the rear of a longitudinally moving vehicle comprising a body and one or more sets of one or more coaxial rear wheels wherein, if there is more than one set, one of the sets is foremost and the other is in tandem rearwardly thereof, said wheels in a set being laterally spaced apart, said equipment comprising:
a generally planar deflector panel having a front surface on which air impinges when the vehicle is in motion, said panel having longitudinally spaced apart leading and trailing margins and laterally spaced apart side margins, the lateral width of said deflector being at least great enough to extend across the space between said foremost rear wheels, and
means for mounting said deflector panel under said body at a longitudinal angle forward of the foremost rear wheels with enough space between said deflector and wheels to meet clearance requirements, said angle being such that a major portion of said impinging air is directed downwardly and rearwardly for flowing between said wheels into said aft region to thereby reduce said vacuum.

11. The invention as claimed in claim 10 wherein the longitudinal dimension of said deflector panel is great enough for the edge of said trailing margin to be at a sufficient height above road level to meet clearance requirements.

12. The invention as in claim 10 wherein the front surface of said panel has compound curvature.

13. A method of reducing the vacuum that normally develops in the ambient region behind the rear of a moving vehicle where said vehicle has at least a pair of coaxial laterally spaced apart wheels under said vehicle near its rear, said method comprising:

locating a deflector panel adjacent and forward of the rear wheels for said panel to span at least the distance between said pair of wheels, and angulating said panel so its top edge is more forward than its bottom edge for said panel to direct a substantial part of the air that impinges on it when said vehicle is in motion downwardly and rearwardly between said pair of wheels and to said ambient region to thereby reduce said vacuum.

* * * * *

UNITED STATES PATENT AND TRADEMARK OFFICE
CERTIFICATE OF CORRECTION

PATENT NO. : 4,262,953
DATED : April 21, 1981
INVENTOR(S) : John C. McErlane

It is certified that error appears in the above—identified patent and that said Letters Patent is hereby corrected as shown below:

Claim 1, Column 5, Line 27 "longitudinally" should read
--longitudinal--

Claim 3, Column 5, Line 38 --and-- should be inserted between
leading and trailing Claim 4, Column 5, Line 47 "ar" should read --air--

Claim 4, Column 5, Line 56 --between-- should be inserted
between distance and the Signed and Sealed this Thirtieth Day of June 1981

[SEAL]

Attest:

RENE D. TEGTMEYER

Attesting Officer     Acting Commissioner of Patents and Trademarks